(12) United States Patent
Martin (10) Patent No.: US 7,533,138 B1
(45) Date of Patent: May 12, 2009

(54) PRACTICAL LOCK-FREE DOUBLY-LINKED LIST

(75) Inventor: Paul A. Martin, Arlington, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 392 days.

(21) Appl. No.: 11/125,910

(22) Filed: May 10, 2005

Related U.S. Application Data (63) Continuation-in-part of application No. 10/820,661, filed on Apr. 7, 2004.

(60) Provisional application No. 60/571,059, filed on May 14, 2004.

(51) Int. Cl.
*G06F 17/30* (2006.01)
*G06F 9/46* (2006.01)
*G06F 9/45* (2006.01)
*G06F 13/00* (2006.01)

(52) U.S. Cl. ................... 707/206; 718/100; 717/151; 711/154

(58) Field of Classification Search ........... 707/100
See application file for complete search history.

(56) References Cited

U.S. PATENT DOCUMENTS

| | | | |
|---|---|---|---|
| 6,826,583 B1 * | 11/2004 | Flood et al. | 707/206 |
| 6,826,757 B2 * | 11/2004 | Steele et al. | 719/314 |
| 7,000,234 B1 * | 2/2006 | Shavit et al. | 719/315 |

(Continued)

OTHER PUBLICATIONS

"Lock-Free Linked Lists Using Compare-and Swap", author: John D. Valois Dated Jul. 1, 1997.*

(Continued)

*Primary Examiner*—Neveen Abel Jalil
*Assistant Examiner*—Tarek Chbouki
(74) *Attorney, Agent, or Firm*—Park, Vaughan & Fleming LLP (57) ABSTRACT

One embodiment of the present invention provides a system that supports inserting or deleting nodes at any location within a doubly-linked list which is lock-free, wherein lock-free means that the doubly-linked list can be simultaneously accessed by multiple processes without requiring the processes to perform locking operations (non-blocking) and furthermore that a finite number of steps performed by a process will guarantee progress by at least one process (lock-free). During operation, the system receives a reference to a target node to be deleted from the doubly-linked list. Next, the system atomically marks a forward pointer in the target node to indicate that the target node is deleted, wherein the forward pointer contains the address of an immediately following node in the doubly-linked list, and wherein the marking operation does not destroy the address of the immediately following node. Additional cleanup steps are then done by this or any other process. The system may also receive a new node which is accessible by only the requesting thread and may then insert the new node into the doubly linked list after a reference node. The system accomplishes this by setting the new node's backward pointer to the reference node and forward pointer to the successor of the reference node. Next, the system atomically changes the forward pointer of the reference node from the successor node to the new node. Additional cleanup steps are then done by this or any other process. An update operation that atomically performs a delete of an old node and an insert of its replacement node is also described.

22 Claims, 6 Drawing Sheets

U.S. PATENT DOCUMENTS

| | | | | |
|---|---|---|---|---|
| 7,092,978 | B2 * | 8/2006 | Garthwaite | 707/206 |
| 7,117,502 | B1 * | 10/2006 | Harris | 719/315 |
| 7,194,495 | B2 * | 3/2007 | Moir et al. | 707/206 |
| 7,254,597 | B2 * | 8/2007 | Moir et al. | 707/206 |
| 7,293,143 | B1 * | 11/2007 | Shavit et al. | 711/147 |
| 7,299,242 | B2 * | 11/2007 | Moir et al. | 707/103 Z |
| 7,395,274 | B2 * | 7/2008 | Moir et al. | 707/103 Z |
| 2001/0047361 | A1 * | 11/2001 | Martin et al. | 707/103 R |
| 2001/0056420 | A1 * | 12/2001 | Steele et al. | 707/8 |
| 2004/0015510 | A1 * | 1/2004 | Moir et al. | 707/101 |
| 2004/0088702 | A1 * | 5/2004 | Garthwaite et al. | 718/100 |
| 2004/0153687 | A1 * | 8/2004 | Moir et al. | 714/1 |
| 2004/0167947 | A1 * | 8/2004 | Garthwaite | 707/206 |

OTHER PUBLICATIONS

"Safe Memory Reclamation for Dynamic Lock-Free Objects Using Atomoc Reads and Writes", Author: Maged M, Michael dated Sep. 18, 2002, IBM ThomasJ. Watson Research Center.*

"CAS-Based Lock-Free Algorithm for Shared Deques", Author: Maged M, Michael dated May 28, 2003, IBM ThomasJ. Watson Research Center.*

"A Pragmatic Implementation of Non-blocking Linked lists", Authors:Tomothy L. Harris, Dated Jul. 31, 2001.*

Publication: "CAS-Based Lock-Free Algorithm for Shared Deques" by Maged M. Michael, Euro-Par 2003, The Ninth Euro-Par Conference on Parallel Processing, LNCS vol. 2790, Aug. 2003, pp. 651-660, magedm@us.ibm.com.

Publication: "A Pragmatic Implementation of Non-Blocking Linked-Lists", Proceedings of the 15th International Symposium on Distributed Computing, Oct. 2001, pp. 300-314, tim.harris@cl.cam.ac.uk.

Publication: "High Performance Dynamic Lock-Free Hash Tables and List-Based Sets", The 14th Annual ACM Symposium on Parallel Algorithms and Architectures, Aug. 2002, pp. 73-82.

* cited by examiner

PRACTICAL LOCK-FREE DOUBLY-LINKED LIST

RELATED APPLICATION

This application is a continuation-in-part of, and hereby claims priority under 35 U.S.C. § 120 to, U.S. patent application Ser. No. 10/820,661, entitled, "Method and Apparatus for Performing Lock-Free Updates in a Linked List," by inventor Paul A. Martin, filed on 7 Apr. 2004 (pending). In addition, this application hereby claims priority under 35 U.S.C. §119 to U.S. Provisional Patent Application No. 60/571,059, filed on 14 May 2004, entitled "A Lock-Free Doubly-Linked List," by inventor Paul A. Martin (Appl. No. 60/571,059).

BACKGROUND

1. Field of the Invention

The present invention relates to the design of lock-free data structures within computer systems. More specifically, the present invention relates to a method and apparatus for implementing a practical, lock-free doubly-linked list.

2. Related Art

Operations on linked lists become more complicated in a multi-threaded environment, because concurrently executing threads can potentially interfere with each other while accessing the same linked list. In order to prevent such interference, some systems use locks to prevent different threads from interfering with each other. Unfortunately, locks often cause processes to stall, which can lead to significant performance problems, especially in systems that support large numbers of concurrently executing processes.

Because of the performance problems that arise from locks, a number of researchers have developed "lock-free" data structures, such as linked lists, that operate efficiently in a multi-threaded environment. Harris describes a way to build and modify a lock-free linked list that can be constructed using only load-linked (LL)/store-conditional (SC) or compare-and-swap (CAS) instructions (see [Harris2001] Timothy L. Harris, "A Pragmatic Implementation of Non-Blocking Linked-Lists," *Proceedings of the 15th International Symposium on Distributed Computing*, October 2001, pp. 300-14). Michael uses a variant of the Harris linked-list as the underlying structure for a lock-free hash table (see [Michael 2002] Maged M. Michael, "High Performance Dynamic Lock-Free Hash Tables and List-Based Sets," *The 14th Annual ACM Symposium on Parallel Algorithms and Architectures*, pages 73-82, August 2002).

So far, none of these researchers have developed a lock-free doubly-linked list. A doubly-linked list is an important data structure for achieving computational efficiency in a diverse range of applications. A doubly-linked list allows searching in both forward and backward directions, and additionally allows insertion at any point and deletion at any point. Michael has developed a lock-free shared double-ended queue (see Maged M. Michael, "CAS-Based Lock-Free Algorithm for Shared Deques," *The Ninth Euro-Par Conference on Parallel Processing*, LNCS volume 2790, pages 651-660, August 2003.). However, this double-ended queue does not support searching through the queue in both forward and backward directions, and does not support insertion or deletion at any point in the queue.

Hence, what is needed is a method and an apparatus for implementing a lock-free doubly-linked list.

SUMMARY

One embodiment of the present invention provides a system that supports deleting a node from a doubly-linked list which is lock-free, wherein lock-free means that the doubly-linked list can be simultaneously accessed by multiple processes without requiring the processes to perform locking operations (non-blocking) and furthermore, that a finite number of steps by a process will guarantee progress by at least one process (lock-free). During operation, the system receives a reference to a target node to be deleted from the doubly-linked list. Next, the system atomically marks a forward pointer in the target node to indicate that the target node is deleted, wherein the forward pointer contains the address of an immediately following node in the doubly-linked list, and wherein the marking operation does not destroy the address of the immediately following node. The system then splices the target node out of the doubly-linked list. This involves atomically modifying the forward pointer of an immediately preceding node in the doubly-linked list to point to the immediately following node in the doubly-linked list, instead of pointing to the target node. It also involves modifying the backward pointer of an immediately following node in the doubly-linked list to point to the immediately preceding node in the doubly-linked list, instead of pointing to the target node.

In a variation on this embodiment, the system inserts a new node into the doubly-linked by first identifying a node immediately preceding a desired location of the new node in the doubly-linked list, and a node immediately following the desired location of the new node in the doubly-linked list. The system then creates the new node to which no other process has any reference and setting its value slots as desired. Next, the system splices the new node into the doubly-linked list by: setting the forward pointer of the new node to point to the immediately following node; setting the backward pointer of the new node to point to the immediately preceding node; atomically updating the forward pointer of the immediately preceding node to point to the new node; and updating the backward pointer of the immediately following node to point to the new node.

In a variation on this embodiment, the system obtains a coherent snapshot of the existing node by: copying all values from the existing node into the a private location; and then checking the forward pointer of the existing node to determine whether the existing node has been deleted. If so, the system follows the forward pointer of the existing node to find an updated version of the existing node with which to reattempt the snapshot process. Otherwise, if the existing node has node not been deleted, the snapshot is complete.

In a variation on this embodiment, the system updates one or more fields in an existing node in the doubly-linked list by first obtaining a replacement node to replace the existing node, wherein other processes do not have references to the replacement node and therefore cannot initially access the replacement node. The system then copies a snapshot of the existing node, including forward and backward pointers, to the replacement node. Next, the system updates one or more fields in the replacement node which correspond to the one or more fields to be updated in the existing node. The system then replaces the existing node with the replacement node by performing a single atomic operation that modifies a forward pointer of the existing node to point to the replacement node and also marks the forward pointer to indicate that the existing node is deleted. In this way, the replacement node becomes part of the doubly-linked list and the existing node is deleted in a single atomic operation. The system completes the replacement process by atomically updating the forward pointer of the predecessor node of the newly deleted node to point to the replacement node, updating the backward pointer of the replacement node to point to this predecessor, and updating the backward pointer of the immediately following node to point to the replacement node. These cleanup actions can be performed by other processes if the process doing the replacement does not finish them.

In a variation on this embodiment, while following a forward pointer from a reference node to a following node in the doubly-linked list, the system proceeds from the reference node passing through, and optionally cleans up, nodes that are marked as dead (deleted) until a live (undeleted) node is found. Next, if a live node is found, the system returns the live node. Otherwise, if the end of the doubly-linked list is reached without finding a live node, the system returns NULL.

In a variation on this embodiment, while following a backward pointer from a reference node to a preceding node in the doubly-linked list, the system proceeds backwards from the reference node passing through nodes that are marked as dead (deleted) until a live (undeleted) node is found. Next, if a live node is found, the system compares the forward pointer of the live node against the reference node. If the forward pointer of the live node points to the reference node, the system returns this live node. (If this live node is not directly pointed to by the reference node's backpointer, a cleanup action is done, resetting the backpointer to it.) Otherwise (the forward pointer of the live node does not point to the reference node), the system follows forward pointers from the live node until a more-forward live node is found that points to the reference node. If such a more-forward live node is found, the system returns the more-forward live node. Whenever the search follows a forward pointer from a live node to a more-forward live node, the backward pointer of the more-forward live node is updated, if necessary, to be consistent with the forward pointer from the live node. Furthermore, a special value (such as NULL) is returned if the reference node is deleted at any time during the search, and NULL is returned if the start of the doubly-linked list is encountered before finding a live node.

In a variation on this embodiment, marking the forward pointer to indicate that the target node is deleted involves atomically setting a "deleted bit" in the forward pointer.

In a variation on this embodiment, marking the forward pointer to indicate that the target node is deleted involves: creating a special node with a deleted type, which points to the immediately following node in the doubly-linked list; and then atomically replacing the forward pointer with a pointer to special node.

BRIEF DESCRIPTION OF THE FIGURES

Table 1A presents part of an exemplary code listing in accordance with an embodiment of the present invention.

Table 1B presents another part of the exemplary code listing in accordance with an embodiment of the present invention.

Table 1C presents yet another part of the exemplary code listing in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices, such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as a LAN, a WAN, or the Internet.

Computer System

Figure 1:
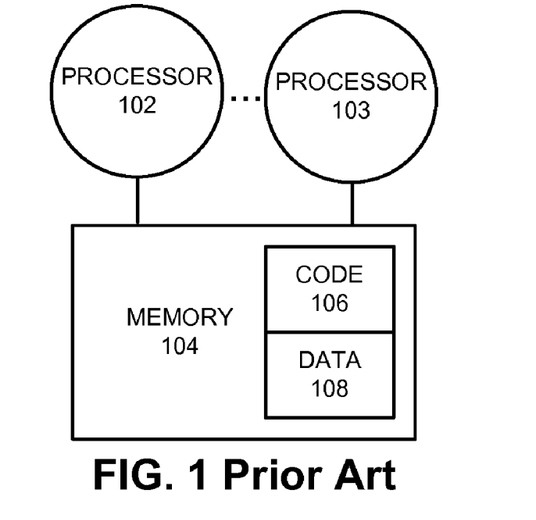
FIG. 1 illustrates a computer system in accordance with an embodiment of the present invention.

FIG. 1 illustrates a computer system 100 in accordance with an embodiment of the present invention. Computer system 100 can generally include any type of computer system with one or more processors. Hence, computer system 100 can include, but is not limited to, a microprocessor, a mainframe computer, a digital processor, a personal computing device, a personal organizer, a device controller, and a computational engine within an appliance—in all these cases the system may have a single processor or multiple processors.

Computer system 100 includes one or more processors 102-103 that access a memory 104. Memory 104 contains code 106 that performs the below-described linked list operations. Memory also stores data 108, which includes the data structures and other variables associated with the below-described doubly-linked list operations.

Doubly-Linked List

Figure 2A:
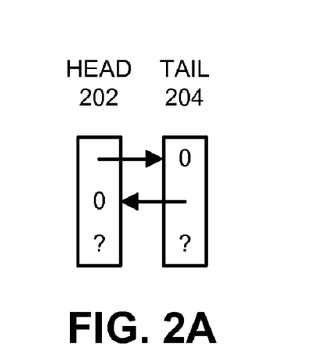
FIG. 2A illustrates an empty doubly-linked list in accordance with an embodiment of the present invention.

FIG. 2A illustrates an empty doubly-linked list in accordance with an embodiment of the present invention. The empty list illustrated in FIG. 1 includes a head node 202 and a tail node 204. Head node 202 is a dummy node that does not contain any data, but has a forward pointer that points to the first node in the doubly-linked list, or to tail node 204 if there are no nodes in the doubly-linked list.

Figure 2B:
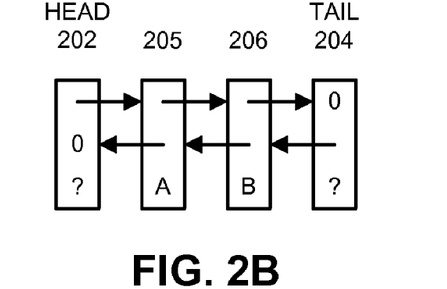
FIG. 2B illustrates a doubly-linked list with two entries in accordance with an embodiment of the present invention.

FIG. 2B illustrates a doubly-linked list with two entries in accordance with an embodiment of the present invention. This doubly-linked list includes two nodes 205 and 206 containing data values A and B, respectively.

Operations that can be performed on a doubly-linked list are described in more detail below.

Overview

Work on supporting concurrent interactions among threads without relying on locks has generally taken one of two approaches: general solutions that can be applied to existing lock-dependent techniques, and "library" solutions which offer special data structures in a library to be used with code that is otherwise fairly thread-oblivious.

One embodiment of the present invention is implemented as a "library" module providing the functionality of a traditional doubly-linked list for lock-free use by multi-threaded applications. As with any doubly-linked list, it also implements a deque (double-ended queue).

Moreover, our technique is practical; it runs on commonly available hardware and does not require a double compare-and-swap (DCAS) instruction or an extra-wide compare-and-swap (CAS) instruction. Its size is totally dynamic, requiring no pre-allocation of maximum memory or any special kernel-level handling of its memory. It uses a minimum number of "expensive" operations, such as CAS or load-lock/store-conditional (LL/SC) operations, making it faster than approaches that perform a DCAS using multiple CAS operations. It also uses head and tail pointers which are final, so they can reside in multiple read caches without any conflicts caused by writing them. Furthermore, it scales well to large numbers of concurrent operations by avoiding all interference between operations working on non-overlapping portions of the list. For instance, when used as a deque, pushes and pops at one end do not interfere with operations on the other end unless the deque is nearly or completely empty.

Motivation

Providing library data structures for concurrent programming is an ideal way to encapsulate the complexity of lock-free techniques while providing a clean interface to code that would otherwise require locks for its correctness.

A traditional doubly-linked list controlled by a global lock allows any thread to find, read, insert, delete, or alter a node at any place in the structure, and does so without requiring a search from the head of the list to perform each operation. Our lock-free list supports all these operations, and thus subsumes the operations of a deque as well.

Additionally, using such a list to represent a generalized queue provides independence between threads that a singly-linked list cannot. It allows any thread which has a pointer to a node in the queue to remove that node without assistance from the other threads; the double links suffice to achieve both the logical deletion and the structural cleanup.

The Lock-Free Linked List

Creating a lock-free doubly-linked list is done by extending Tim Harris' linked-list design [Harris2001]. In his scheme (as simplified in its deletion details by Maged Michael [Michael2002]), the list is threaded by forward pointers that reserve a single bit as a boolean that can be altered in the same atomic action that alters the linking pointer.

This included boolean is used for a two-step deletion operation; although it is stored with the pointer to the next node, it is a logical indicator of the deletion status of the node in which it resides. Atomically changing the next link of a cell from live-and-next to dead-and-next logically deletes the cell containing the link, not the one pointed to as next.

Carrying the delete bit in the forward pointer memory word serves to block all other threads from accidentally inserting a new node as the successor of a dead node. Their code using a CAS to do an insertion predicts that the link they are swinging is marked alive; the CAS thus fails if another thread has deleted the node during their insertion operation.

Subsequent operations by the deleting thread or by any other thread that knows the predecessor node of the dead node can then complete the operation of swinging the next link of the predecessor node to point beyond the newly dead node to its successor. Until the cleanup is completed, the next portion of the dead-marked node's link still carries the address information needed to hold the list together, providing the information that allows threads other than the original deleter to complete the cleanup.

Nodes with Multiple Data Slots

An additional goal has been to support complex nodes. Published lock-free list techniques are limited to storing only a single value in a node (so they can only represent a set or multi-set) or to having all the data in a node remain immutable; there is no provision for a node with a key and a value where the value can be updated, or for altering the kinds of many-slotted objects that are commonly used in object oriented languages.

Atomic Updates

We extend Harris' use of the delete bit to support atomic updates of complex nodes.

An atomic update is achieved by building a private copy of the target node using the snapshot technique, altering the private copy, and then atomically replacing the original node with the private one. This atomic replacement is achieved by CASing the forward pointer of the original node from live-and-next to dead-and-replacement, a move that simultaneously deletes the original and inserts the updated one.

This update move differs crucially from the sequence of a deletion followed by an insertion in that there is never a time when a version of the node is not in the list. Any searching thread comparing some slot as a key will find there is a node with that key present in the list, and by snapshotting as described below, can retrieve a coherent set of slot values. This update scheme works with any form of Harris' list where the delete bit is the logical indication of a dead node.

If contending threads are attempting to update or delete a node, the CAS may fail because another thread has marked the delete bit of the forward pointer of the original node. Diagnosing the CAS failure reveals this, and allows the updating thread to move on to the newly updated version of the node and repeat the read-alter-update process as needed. Another process changing the successor of the target node may also cause the CAS to fail, but this is easily diagnosed and the update CAS retried with the predicted addresses (forward pointer of update node and forward pointer of target node) updated.

Atomic Snapshots

Our update procedure supports an easy way to read the slots of a complex node as a snapshot. The snapshot is done by reading all the slots of a node into private memory and then checking the node's delete bit. If it is not deleted, the snapshot was a successful capture of the slots. If the node was deleted during the reading, the snapshot is still a coherent picture of the slots, but it is known to no longer be the current status. To support this read method we must not delete the contents of dead nodes until they are garbage collected, and we must use the update scheme described above. If the reading process discovers that the node has been marked deleted, it will follow the forward pointer to seek a replacement node. If such is located, the snapshot is attempted again; otherwise the node has been deleted from the list.

Double-Linking through Asymmetric Extension

The key to our doubly-linked list is an asymmetric extension of the singly-linked list. We create a doubly-linked list by adding backward pointers that are updated lazily compared to the ground truth represented in the forward pointers. Following the Harris list we use a delete bit on the forward pointer of a node to indicate that the node is logically deleted, but in the doubly-linked list we have additional cleanup steps to complete after the logical deletion. Besides splicing the forward pointers to go around a newly deleted node, we must correct the back-pointer of the subsequent node to point to its newly adjacent predecessor. This update of the backward pointer to reflect the corresponding forward pointer is always done after the update of the forward pointer.

A similar lazy update is needed to clean up the backward pointer of the successor node after an insertion. When a new node is inserted, its forward and backward pointers are constructed to be guaranteed to be current, and the insertion action itself corrects the forward pointer of the predecessor node, but the back-pointer of the node after the new one will still be pointing where it was, now one node too far back.

In updating the backward pointers, we incorporate a rule similar to the Michael forward pointer cleanup, ignoring the backward pointers from dead nodes and correcting the back-pointers between live nodes shortly after making any changes to the forward pointers. But since the back-pointers are not directly influenced by the dead bit of a node (which is an atomic part of its forward pointer), we may sometimes update a back-pointer of a node that became dead after the updating was started. Because the back-pointers are treated as hints, this does not impact correctness.

Correctness Sketch

We depend upon the correctness results of the Harris list with Michael's modifications for correctness in the most basic operations of the doubly-linked list.

Through all stages of the operations in the doubly-linked list, the forward pointers and their associated boolean bits are treated as the ground truth that maintains the soundness of the list. The backward pointers are constrained to be correct at the time of their creation, and otherwise are treated as possibly-stale hints used to find the relevant forward pointers.

Simple arguments involving the head and tail dummy nodes support our additional claims about the use of the doubly-linked list as a deque. Because deque uses the immutable head and tail dummy nodes as the referents in all its operations, failures caused by deleted referents do not arise.

Performance

The linkage of the doubly-linked list differs from a traditional one for use by a single thread (or protected by a lock that ensures only a single thread may operate on it at a time) only when an insertion or deletion (or an update which combines these operations) has been logically achieved but has not yet been cleaned up. Each thread that alters the list performs the required cleanups associated with its operation, but it may be delayed by an arbitrary period before completing its cleanup. Any thread discovering a logically complete operation that has not been cleaned up can read all the information needed to complete the cleanup from the rest of the data structure; the cleanup can be done by any thread.

This design allows no more logically complete but not yet cleaned up operations than there are threads that are currently stalled during their operations; a loose and informal ceiling on the amount of deferred work that the structure may contain, but a practical limit nonetheless.

Abstract Interface

The doubly-linked list presented here offers an interface similar to what a single-threaded doubly-linked list would—the operations of a singly linked list, but available from either direction. As presented here, the list also offers the operations of a deque which has been implemented on top of the basic list.

The deque operations are simple; pushing and popping either end. A pushHead or pushTail always succeeds, and causes a node with the specified slots value(s) to appear at the specified end of the deque. A popHead or popTail will return a node that was the nearest one to their respective end at some time during their execution, and will return an empty flag if the deque was empty throughout their execution. If the deque was empty during only part of their execution, either an appropriate node or the empty flag will be returned. An entry in the deque can be popped only once.

DeleteNode is the only additional list operation that always succeeds; upon its return, the indicated node is no longer in the logical list. DeleteNode returns a flag that is true when it was the operation that deleted the node, and false if some other thread did the deletion. The contents of a deleted (or popped) node can still be read by any thread, but these contents are marked as outdated upon deletion.

ListNext and listPrevious return a reference to a live node that was adjacent to the reference node in the indicated direction at some time during their execution. That node is not removed from the list nor altered by this operation. If there is no node between the reference node and the logical end of the list in the indicated direction, NULL is returned. Similarly, if the reference node is deleted before the completion of the operation, a special value (which may be chosen to be NULL)

is returned. If NULL is used for both cases, these cases can be distinguished by whether the reference node is found to have been deleted InsertAfter and insertBefore cause a node to be added to the list adjacent to the reference node in the indicated direction. It will return failure if the reference node is deleted before completion of the operation.

Note that the deque operations do not suffer the failure modes based on the deletion of the reference node, since the head and tail indicators of the deque serve this role and they are never deleted.

Snapshot returns a private node that has a copy of the data values from the indicated node. These values are an atomic snapshot of all the data in a node, and were the current values at some time during the execution of the operation.

Update atomically replaces an entry in the list with a new one. The operation atomically removes the old entry and installs the new one so that exactly one is in the list at every time during its operation.

Set Up and Ground Rules

An empty list has head and tail dummy nodes which point to each other; they are the same form as the real data nodes to be used in the list but need not contain keys or values. Other embodiments may omit these dummy nodes but in such case the code requires additional tests for determining when a node is at either end of the linked list.

These dummy nodes have NULL pointers in the direction "beyond" the list; checking for these allows operations to avoid over-runs while also detecting a damaged data structure. Since both head and tail global dummy node pointers are final values after initialization, reading them does not cause cache conflicts among the processors that are doing operations on the list.

Insertions and deletions can be done anywhere in the list, but exceptions are thrown for attempting nonsense such as deleting either dummy or insertion after the tail or before the head. Deletions from an empty list simply return NULL. Insertions at the beginning or end of a list will always succeed, but insertions before or after a reference node will fail if the reference node is removed before the insertion completes.

Since the head and tail dummies are never deleted, pushHead (which is insertAfter head dummy) and pushTail (which is insertBefore tail dummy) operations always succeed.

ListNext

ListNext from a reference node simply follows the next pointer of the node, proceeding through (and optionally cleaning up) any dead-marked nodes until it reaches a live one. It succeeds and returns that node unless it found the tail dummy, in which case it returns NULL.

The node returned may be deleted by another thread before the thread seeking it examines it, but listNext can be linearized at the time the returned node was discovered to be live; it was alive at some time between the call to listNext and the return of the node.

Figure 3A:
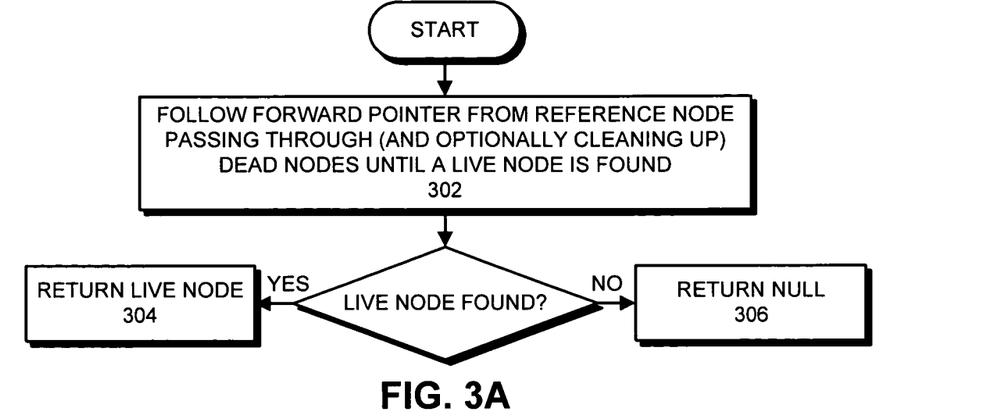
FIG. 3A presents a flow chart illustrating a list-next operation in accordance with an embodiment of the present invention.

More specifically, referring to the flow chart in FIG. 3A, the listNext operation proceeds as follows. While following a forward pointer from a reference node to a following node in the doubly-linked list, the system proceeds from the reference node passing through, and optionally cleaning up, nodes that are marked as dead (deleted) until a live (undeleted) node is found (step 302). Next, if a live node is found, the system returns the live node (step 304). Otherwise, if the end of the doubly-linked list is reached without finding a live node, the system returns NULL (step 306).

ListPrevious

ListPrevious follows the back-pointer from the reference node, and verifies that the node found is still alive and further that it has a next pointer to the reference node. If the node found from the back pointer is dead, then further back-pointers are followed to find a live node (and to optionally update the back-pointer to it).

When a live node is found, either immediately or after a chase through dead ones, its next pointer is checked against the reference node. If they match, it is returned; otherwise the next pointer is followed to find the next live node which contains a next pointer matching the reference node.

So long as the reference node used for a listPrevious operation remains alive in the list, this method will return the live (or dummy) node that is its predecessor. However, when the reference node is deleted, there is no longer a clearly defined previous node for it since it may be (or may become) the case that no live node still points to it as its successor. For this reason, listPrevious returns a special value (which may be chosen to be NULL) if its reference node is deleted during the search.

Whenever the search follows a next link forward from a live node to a more forward live node, the back-pointer of the forward node is set to reflect the forward pointer that is the ground truth of the list.

Figure 3B:
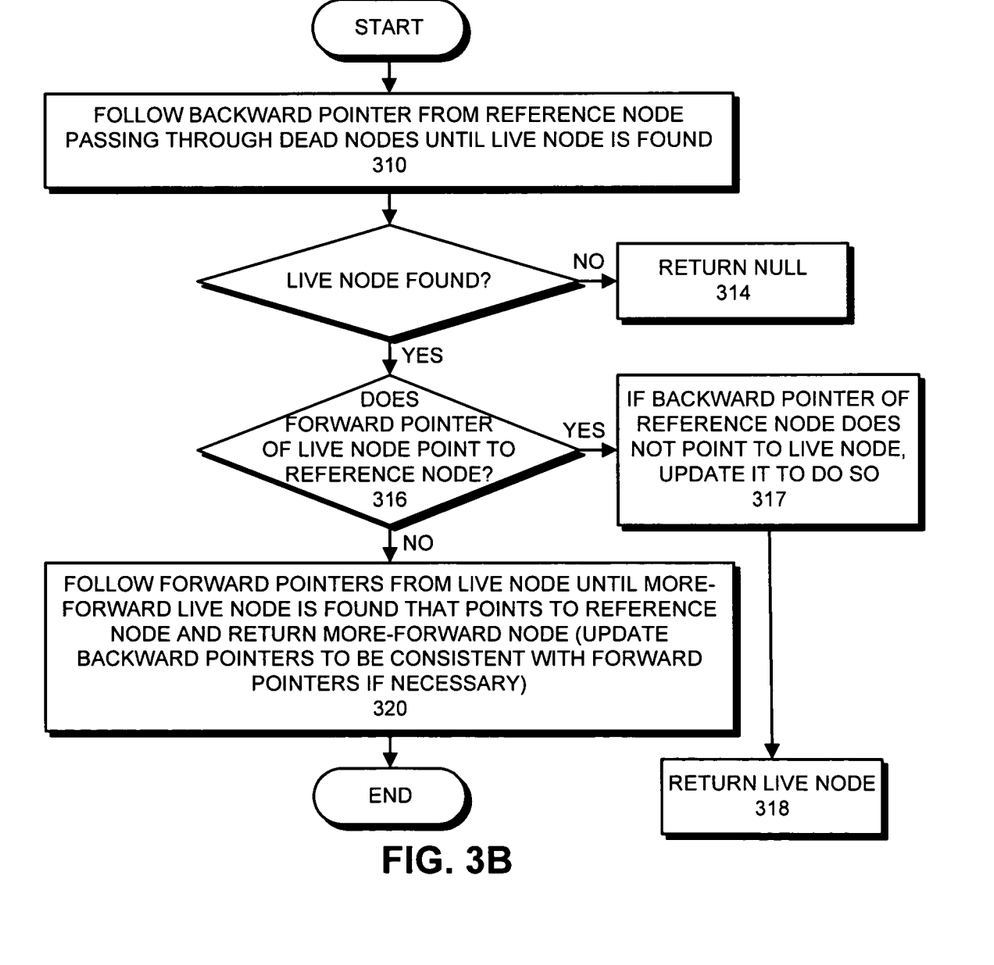
FIG. 3B presents a flow chart illustrating a list-previous operation in accordance with an embodiment of the present invention.

More specifically, referring to the flow chart in FIG. 3B, the listPrevious operation proceeds as follows. The system follows a backward pointer from the reference node passing through nodes that are marked as dead (deleted) until a live (undeleted) node is found (step 310). If a live node is not found, the system returns NULL (step 314). Otherwise, if a live node is found, the system compares the forward pointer of the live node against the reference node (step 316). If the forward pointer of the live node points to the reference node, the system checks if the backward pointer of the reference node points to a live node, and if not updates it to do so (step 317). The system then returns the live node (step 318). Otherwise, if at step 316 the forward pointer of the live node does not point to the reference node, the system follows forward pointers from the live node until a more-forward live node is found that points to the reference node, and if such a more-forward live node is found, the system returning the more-forward live node (step 320). Whenever the search follows a forward pointer from a live node to a more-forward live node, the backward pointer of the more-forward live node is updated, if necessary, to be consistent with the forward pointer from the live node. Furthermore, a special value (commonly chosen to be NULL) is returned if the reference node is deleted at any time during the search, and NULL is returned if the start of the doubly-linked list is encountered before finding a live node (step 314).

Deletion

Deletion is done by using a CAS to change the delete bit of the target node's forward pointer cell from live to dead. This CAS fails if the node has been so marked by some other process, so each node can be killed only once. Once a node is thus marked dead, it is never revived and its forward pointer is no longer altered. (A garbage collector reclaims nodes when they are no longer accessible.)

The cleanup operation for any deleted node has two steps, which can be performed by any thread. The first is to CAS the forward pointer of the predecessor node from the dead node to the address in the dead node's next pointer. This splices out the dead node for forward transit through the list. If the dead nodes' predecessor is not already known, it can be found by using the node's first live successor as a reference point for the listPrevious method described above.

Once the predecessor's forward pointer is swung to skip the dead node, the node that was the successor of the dead node is the predecessor's new successor, and that node's backward pointer must be swung to reflect the new live forward pointer to it.

Figure 4A:
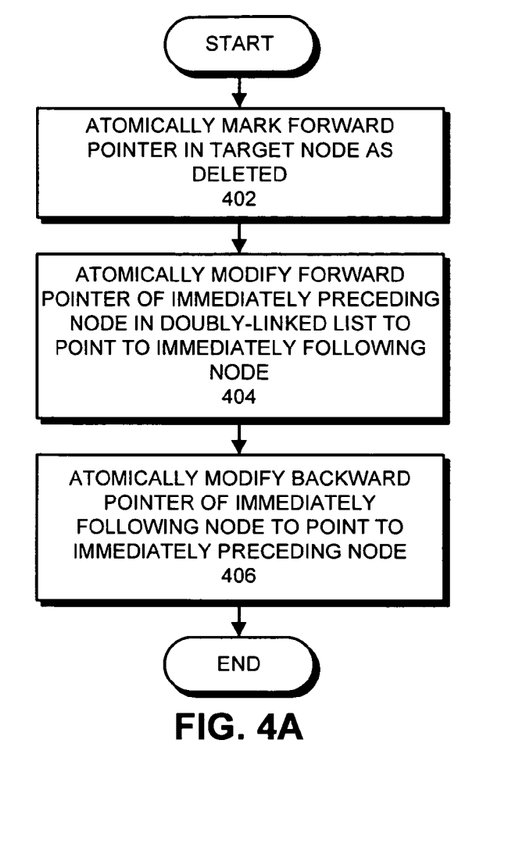
FIG. 4A presents a flow chart illustrating a node-deletion operation in accordance with an embodiment of the present invention.
Figure 4B:
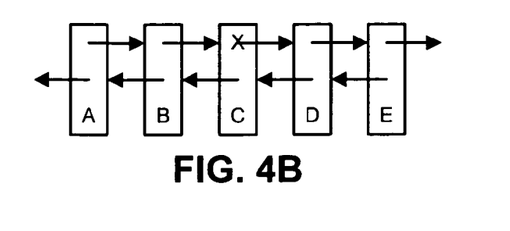
FIG. 4B illustrates one step in the node-deletion operation in accordance with an embodiment of the present invention.
Figure 4C:
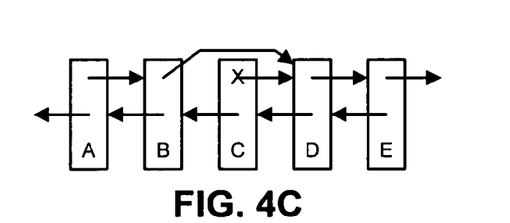
FIG. 4C illustrates another step in the node-deletion operation in accordance with an embodiment of the present invention.
Figure 4D:
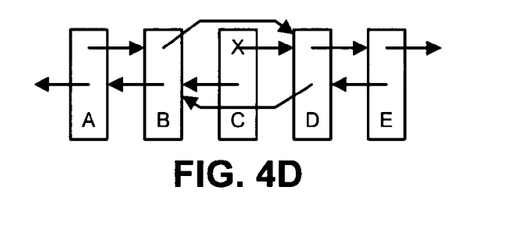
FIG. 4D illustrates yet another step in the node-deletion operation in accordance with an embodiment of the present invention.

More specifically, referring to the flow chart in FIG. 4A the delete operation proceeds as follows. First, the system atomically marks a forward pointer in the target node to indicate that the target node is deleted (step 402), wherein the forward pointer contains the address of an immediately following node in the doubly-linked list, and wherein the marking operation does not destroy the address of the immediately following node (see FIG. 4B). Next, the system splices the target node out of the doubly-linked list. This involves atomically modifying the forward pointer of an immediately preceding node in the doubly-linked list to point to the immediately following node in the doubly-linked list, instead of pointing to the target node (step 404) (see FIG. 4C). It subsequently involves atomically modifying the backward pointer of an immediately following node in the doubly-linked list to point to the immediately preceding node in the doubly-linked list, instead of pointing to the target node (step 406) (see FIG. 4D).

Insertion

Insertion is done by creating a new private node and CAS-ing it into the list. While still in private memory, the new node has its forward pointer set to the successor of the node it is being inserted after, and has its backward pointer set to that predecessor, and its value slot(s) (such as key and data slots), filled as needed. The CAS of the predecessor node's next cell predicts live-and-successor and installs live-and-new. If the predecessor is deleted before the CAS is attempted, the CAS will fail due to the dead bit, and if its successor is changed after the setup but before the CAS, the CAS will fail due to the address clash.

Figure 5A:
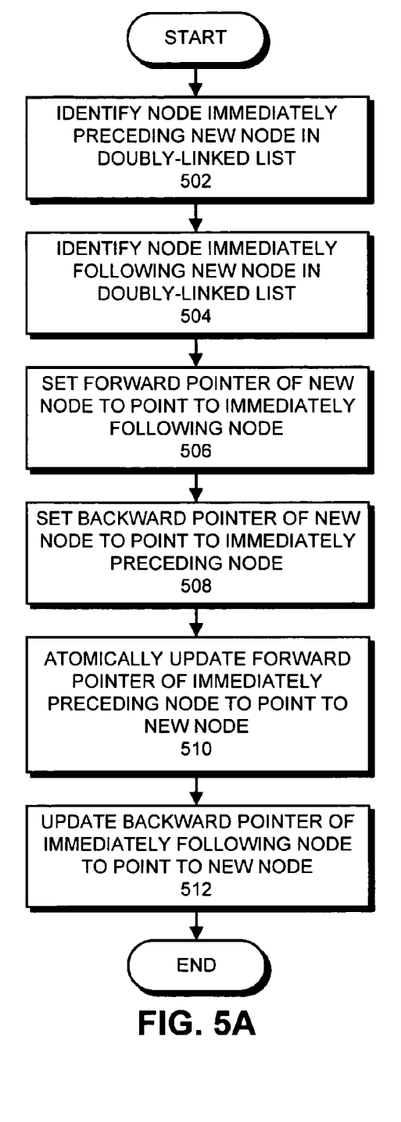
FIG. 5A presents a flow chart illustrating a node-insertion operation in accordance with an embodiment of the present invention.

More specifically, referring to the flow chart in FIG. 5A, the insert operation proceeds as follows. The system first identifies a node immediately preceding the new node in the doubly-linked list (step 502), and a node immediately following the new node in the doubly-linked list (step 504). The system then splices the new node into the doubly-linked list by: setting the forward pointer of the new node to point to the immediately following node (step 506); setting the backward pointer of the new node to point to the immediately preceding node (step 508) (see FIG. 5B); atomically updating the forward pointer of the immediately preceding node to point to the new node (step 510) (see FIG. 5C); and updating the backward pointer of the immediately following node to point to the new node (step 512) (see FIG. 5D).

The insert operation described above is actually an insertAfter operation based on specifying the desired predecessor. An additional operation of insertBefore is supported where the anchor to the list is the desired successor node, and the node to be altered is found using a listPrevious as described above. Because the CAS for insertion is predicting the successor address, the insertBefore operation is assured that the node whose next cell is being updated still had the anchor node as its successor if the CAS succeeds.

Snapshot

In complex lock-less data structures, it is nontrivial to read all of the parts of an object while averting the danger of some being altered during the reading. For example, the first and last names read from a record may not correspond with each other if both were being changed while the reading was in progress.

We address this snapshot problem by making the non-linking portions of our nodes immutable, and using deletion or replacement to effectively change them. To obtain a coherent snapshot, all that is required is to read all data slots of a node into private memory and then read the dead bit from the node's next cell. If the node is still alive, the snapshot succeeded. If the dead bit indicates that the node is dead, the values still represent a coherent snapshot but they may be outdated or even deleted.

A new search starting from the dead node's next forward address will yield either a newer copy of the node (if it was updated) or its successor node (if it was deleted). If the node found this way has the right "key" then the snapshot is repeated using this new node.

Atomic Update

Updating the data in a node is done by making a new node that has the latest values "snapshot" into it, altering the ones requiring updates, and then atomically replacing the old node with the new one.

Figure 5B:
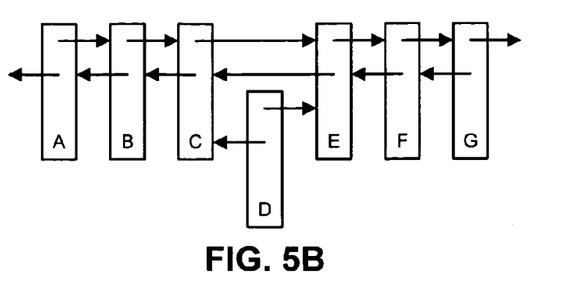
FIG. 5B illustrates one step in the node-insertion operation in accordance with an embodiment of the present invention.
Figure 5C:
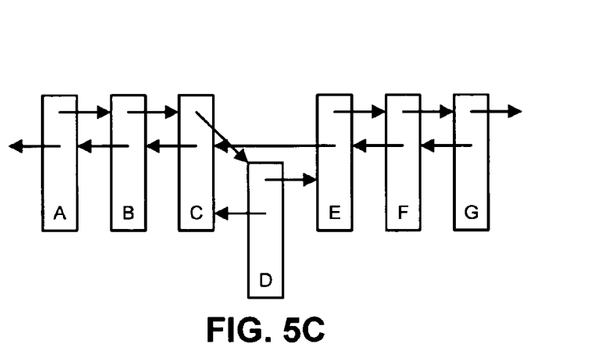
FIG. 5C illustrates another step in the node-insertion operation in accordance with an embodiment of the present invention.
Figure 5D:
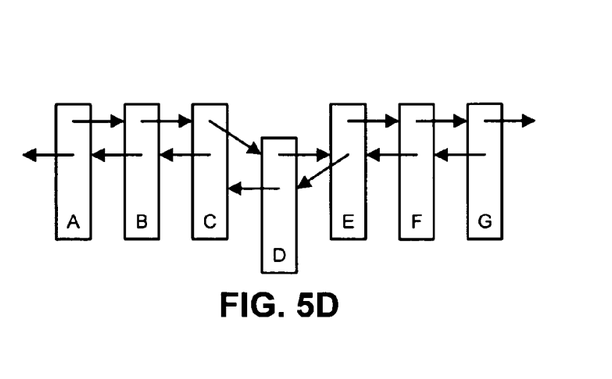
FIG. 5D illustrates yet another step in the node-insertion operation in accordance with an embodiment of the present invention.

Specifically, both forward and backward links in the new node are set up as in a normal insertion after the old node (as shown in node "D" of FIG. 5B). But where the normal insertion would CAS the old node's next cell from live-and-successor to live-and-new, in this case the cell is CAS-ed from live-and-successor to dead-and-new.

When this CAS succeeds the node has been updated; the remaining cleanup moves can be done by any thread. The predecessor node of the old node still has a next pointer to the old node which must be CASed to the new one (as in a normal deletion), the backward pointer of the new node must be updated to point to that predecessor (as in a normal deletion), and the backward pointer of the old successor must be moved to the new one (as in normal insertion).

Figure 6:
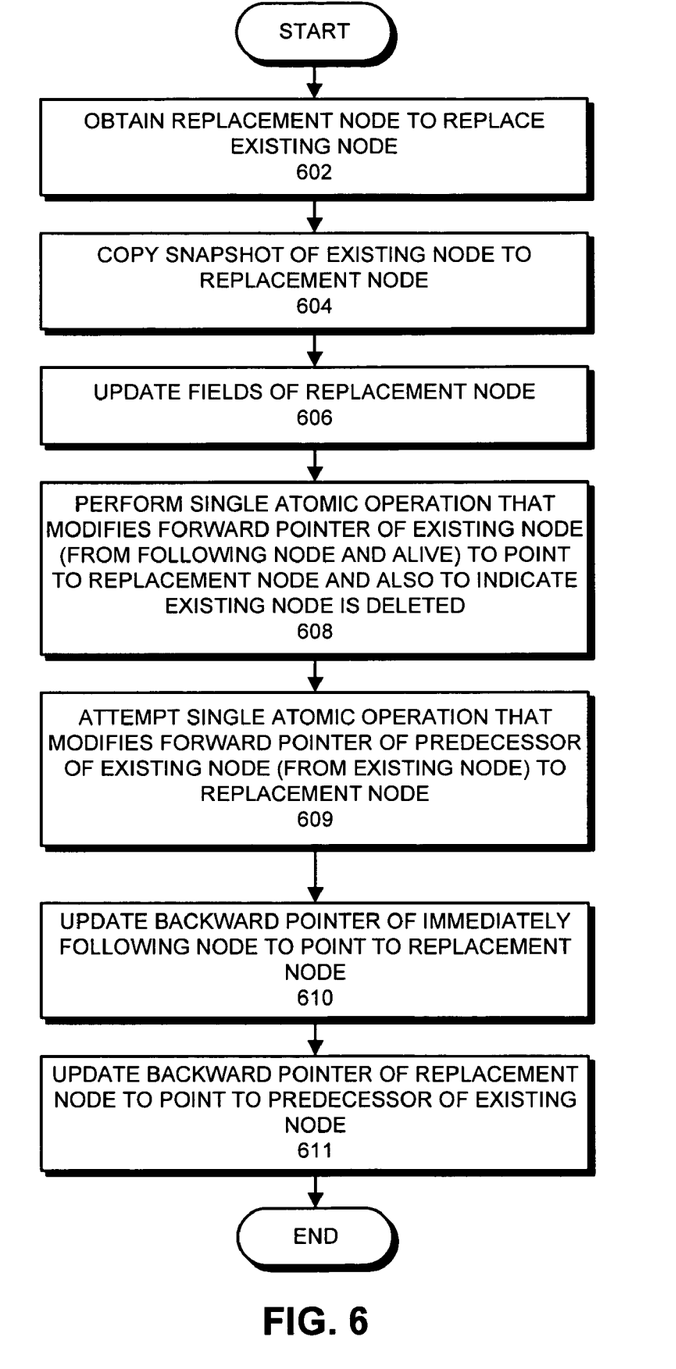
FIG. 6 presents a flow chart illustrating a node-updating operation in accordance with an embodiment of the present invention.
Figure 7A:
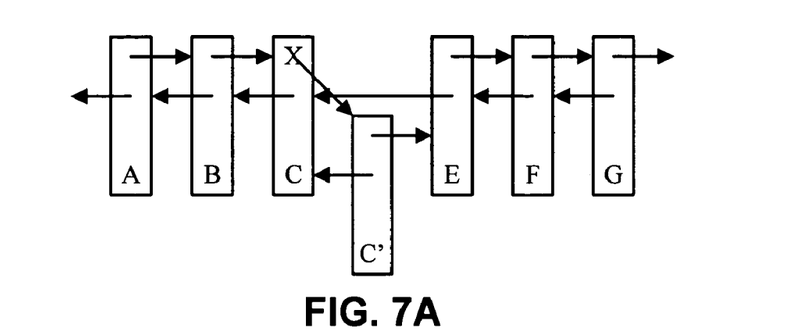
FIG. 7A illustrates the effective step in the node-updating operation in accordance with an embodiment of the present invention.

More specifically, referring to the flow chart in FIG. 6 the system performs an update to one or more fields in an existing node in the doubly-linked list as follows. The system first obtains a replacement node to replace the existing node (step 602), wherein other processes do not have references to the replacement node and therefore cannot initially access the replacement node. The system then copies a snapshot of the existing node, including forward and backward pointers, to the replacement node (step 604—the result so far is illustrated in FIG. 5B). Next, the system updates one or more fields in the replacement node which correspond to the one or more fields to be updated in the existing node (step 606). The system then replaces the existing node with the replacement node by performing a single atomic operation that modifies a forward pointer of the existing node to point to the replacement node and also marks the forward pointer to indicate that the existing node is deleted (step 608) (see FIG. 7A). In this way, the replacement node becomes part of the doubly-linked list and the existing node is deleted in a single atomic operation. Logically, the update is completed, and any other process will now see the new values instead of the old ones.

Figure 7B:
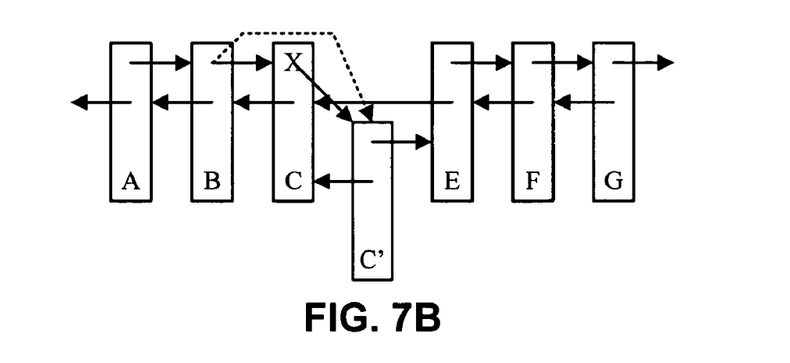
FIG. 7B illustrates a cleanup step in the node-updating operation in accordance with an embodiment of the present invention.
Figure 7C:
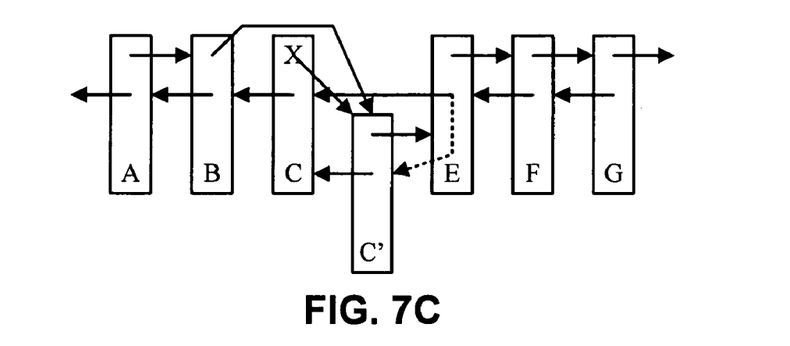
FIG. 7C illustrates an additional cleanup step in the node-updating operation in accordance with an embodiment of the present invention.

Finally, the system completes the replacement process by performing three cleanup actions. Each of these is attempted but may have already been done by another process. An atomic operation is attempted to change the forward pointer of the predecessor node of the existing node from the existing node to the replacement node (step 609) (see FIG. 7B). The backward pointer of the immediately following node is changed to point to the replacement node (step 610) (see FIG.

Figure 7D:
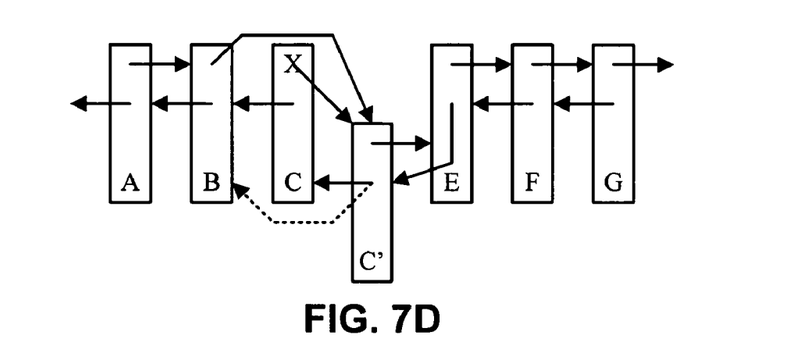
FIG. 7D illustrates the final cleanup step in the node-updating operation in accordance with an embodiment of the present invention.

7C). Finally, the backward pointer of the replacement node is reset to point to the predecessor of the existing node (step 611) (see FIG. 7D).

Storage Recovery

Note that the current technique is designed for use with a garbage collector. Although Harris' singly-linked list can use a number of possible direct collection schemes and Michael details the use of his Safe Memory Recovery to collect the list inside his deque, the addition of a loosely bounded number of possible backward links to a node makes it harder to decide when to release a node in the doubly-linked list. Reference counting techniques for lock-free structures (such as in "Lock-free Reference Counting," Detlefs, Martin, Moir, and Steele in *Proceedings of the 20th Annual ACM Symposium on Principles of Distributed Computing* (PODC '01), 2001), and "node capture" systems (such as in "Safe Memory Reclamation for Dynamic Lock-free Objects Using Atomic Reads and Writes," Michael, in *Proceedings of the 21th Annual ACM Symposium on Principles of Distributed Computing* (PODC '02), 2002) can be used for storage recovery in the absence of a garbage collector.

Exemplary Code Listing

An exemplary code listing for the above-described doubly-linked list appears below in Tables 1A-1C.

TABLE 1A

```
public class DoubleList {
Node headDummy, tailDummy;
DoubleList( ){
    Node hd = new Node( ); Node td = new Node( );
    hd.before = null; td.after = null;
    hd.after = new AtomicMarkableReference(td, false);
    td.before = new AtomicReference(hd);
    headDummy = hd; tailDummy = td;
}
boolean deleteNode (Node thisNode){ // keep trying
        return deleteNode(thisNode, true);
}
Node getLiveForward(Node refNode){// aka listNext
        Node forwardNode = fixForward(refNode);
        if (forwardNode.after == null) return null;
        return forwardNode;
}
Object popHead( ){
    while (true){     Node hn = getHead( );
        if (hn == null) return null;
        if (deleteNode(hn, true)) return hn.value;
}}
void pushHead(Object val){
    boolean done = false;
    while (!done) done = insertAfter(headDummy, val); }
Object popTail( ){
    while (true){     Node tn = getTail( );
        if (tn == null) return null;
        if (deleteNode(tn, false)) return tn.value;
}}
void pushTail(Object val){
    boolean done = false;
    while (!done) done = insertBefore(tailDummy, val);
}
Node getLiveBack(Node refNode){ // aka listPrevious
        Node backNode = getBack(refNode);
        if((backNode == null) || (backNode == headDummy)) return
            null;
        return backNode; }
```

TABLE 1B

```
Node getBack(Node refNode){
    AtomicReference prevRef = refNode.before;
    Node currentNode = refNode;
```

TABLE 1B-continued

```
    while (true){
        prevRef = currentNode.before;
        Node backNode = (Node)prevRef.get( );
        AtomicMarkableReference backAftRef = backNode.after;
        Node backAftNode = (Node)backAftRef.getReference( );
        if (backAftRef.isMarked( )) currentNode = backNode;
        else if (backAftNode ==refNode) return backNode;
        else { Node maybeBack = fixForwardUntil(backNode, refNode);
            if ((maybeBack = null) &&
            backNode.after.isMarked( ))
                currentNode = backNode;
        else return maybeBack;
}}}
Node getTail( ) {return getLiveBack(tailDummy);}
Node getHead( ){ return getLiveForward(headDummy); }
boolean insertAfter(Node previous, Object val){
    Node myNode = new Node( );
    myNodevalue = val;
    while (true){
        AtomicMarkableReference prevAftRef = previous.after;
        if (prevAftRef.isMarked( )) return false;
        Node prevAfter = fixForward(previous);
        if (insertBetween(myNode, previous, prevAfter)) return
            true;
}}
boolean insertBefore(Node following, Object val){
    Node myNode = new Node( );
    myNode.value = val;
    while (true){
        AtomicMarkableReference folAftRef= followingafter;
        if (folAftRef != null &&folAftRef.isMarked( )) return false;
        Node beforeFollowing = getBack(following);
        if (beforeFollowing == null) return false;
        if (insertBetween(myNode, beforeFollowing, following))
            return true;
}}
boolean deleteNode (Node thisNode, boolean retry){
    AtomicMarkableReference nextRef;
    while (true){// til somebody deletes this node
        nextRef = thisNode.after;
        if (nextRef.isMarked( )) return false; // already deleted
        Node next = (Node)nextRef.getReference( );
        if (thisNode.after.compareAndSet(next, next, false,
        true)) break;
        if(!retry) return false; }
    getBack(thisNode); // just for cleanup
    return true; }
```

TABLE 1C

```
void reflectForward(Node previous){
        AtomicMarkableReference prevAftRef = previous.after;
        if (prevAftRef.isMarked( )) return;
        Node afterNode = (Node)prevAftRef.getReference( );
        AtomicReference afterBeforeRef = afterNode.before;
        Node afterBeforeNode = (Node)afterBeforeRef.get( );
        if (afterBeforeNode == previous) return;
        AtomicMarkableReference afterAftRef = afterNode.after;
        if ((afterAftRef == null) || !afterAftRef.isMarked( ))
            afterNode.before.set(previous); }
Node fixForward(Node thisNode){ // return live or dummy successor
        AtomicMarkableReference thisAftRef = thisNode.after;
        Node laterNode = (Node)thisAftRef.getReference( );
        Node laterLater;
        while (true){
            AtomicMarkableReference nextRef = laterNode.after;
            if ((nextRef == null) || !nextRef.isMarked( )){
                reflectForward(thisNode);
                return laterNode;
            }else{
                laterLater = (Node)nextRef.getReference( );
                thisNode.after.compareAndSet(laterNode, laterLater,
                false, false);
                laterNode = laterLater; }}}
Node fixForwardUntil(Node thisNode, Node laterNode){
        AtomicMarkableReference thisNodeAftRef, workNodeAftRef,
```

TABLE 1C-continued

```
            laterNodeAftRef;
        Node nextNode; Node workNode = thisNode;
        while (true){
            thisNodeAftRef = thisNode.after;
            if (thisNodeAftRef.isMarked( )) return null;
            laterNodeAftRef = laterNode.after;
            if ((laterNodeAftRef != null) &&
            laterNodeAftRef.isMarked( )) return null; // just quit
            workNodeAftRef = workNode.after;
            if (workNodeAftRef == null) return null; // hit tailDummy
            if (!(workNodeAftRef.isMarked( ))){ //don't alter
            deleted nodes
                fixForward(workNode);
                workNodeAftRef = workNode.after;} // get the
                updated value
            nextNode = (Node)workNodeAftRef.getReference( );
            if (nextNode == laterNode) return workNode;
            else if (nextNode.after == null) return null;
            else workNode = nextNode;
        }}
    boolean insertBetween(Node thisNode, Node prev, Node aft){
        if (thisNode.before != null) thisNode.before.set(prev);
        else thisNode.before = new AtomicReference(prev);
        if (thisNode.after != null) thisNode.after.set(aft, false);
        else thisNode.after = new AtomicMarkableReference(aft, false);
        if (prev.after.compareAndSet(aft, thisNode, false, false)){
            reflectForward(thisNode); // cleanup aft node
            backpointer
            return true; }
        return false;
}}
```

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for deleting a node from a doubly-linked list which is lock-free, wherein lock-free means that the doubly-linked list can be simultaneously accessed by multiple processes without requiring the processes to perform locking operations and furthermore that a finite number of steps taken by a process will guarantee progress by at least one process, the method comprising:
a processor receiving a reference to a target node to be deleted from the doubly-linked list;
atomically marking a forward pointer in the target node to indicate that the target node is deleted by using a CAS (Compare And Swap) instruction with only one compare-and-swap per atomic operation to change the delete bit of the target node's forward pointer cell from live to dead, wherein the forward pointer contains the address of an immediately following node in the doubly-linked list, wherein the marking operation does not destroy the address of the immediately following node; and
splicing the target node out of the doubly-linked list by,
atomically modifying the forward pointer of an immediately preceding node in the doubly-linked list to point to the immediately following node in the doubly-linked list, instead of pointing to the target node, by using a CAS to change the forward pointer of the immediately preceding node from the target node to the address of the immediately following node, and modifying the backward pointer of an immediately following node in the doubly-linked list to point to the immediately preceding node in the doubly-linked list, instead of pointing to the target node.

2. The method of claim 1, further comprising inserting a new node into the doubly-linked list by:
identifying a node immediately preceding the desired location of the new node in the doubly-linked list;
identifying a node immediately following the desired location of the new node in the doubly-linked list;
creating the new node to which no other process has any reference and setting its value slots as desired; and
splicing the new node into the doubly-linked list by,
setting the forward pointer of the new node to point to the immediately following node,
setting the backward pointer of the new node to point to the immediately preceding node,
atomically updating the forward pointer of the immediately preceding node to point to the new node, and
updating the backward pointer of the immediately following node to point to the new node.

3. The method of claim 1, further comprising performing an update to one or more fields in an existing node in the doubly-linked list by:
obtaining a replacement node to replace the existing node, wherein other processes do not have references to the replacement node and therefore cannot initially access the replacement node;
copying a snapshot of the existing node, including forward and backward pointers, to the replacement node;
updating one or more fields in the replacement node which correspond to the one or more fields to be updated in the existing node;
performing a single atomic operation that modifies a forward pointer of the existing node to point to the replacement node and also marks the forward pointer to indicate that the existing node is deleted, whereby the replacement node becomes part of the doubly-linked list and the existing node is deleted in a single atomic operation; and
cleaning up the doubly-linked list structure by,
atomically moving the forward pointer of the preceding node from existing node to the new node,
updating the backward pointer of the immediately following node to point to the replacement node, and
updating the backward pointer of the new node to point to the predecessor node of the existing node.

4. The method of claim 3, wherein copying the snapshot of the existing node to the replacement node involves:
copying all values from the existing node into the replacement node; and
checking the forward pointer of the existing node to determine whether the existing node has been deleted;
wherein if the existing node has node not been deleted, the snapshot is complete;
wherein if the existing node has been deleted, the method further comprises following the forward pointer of the existing node to find an updated version of the existing node with which to reattempt the snapshot process.

5. The method of claim 1, wherein following a forward pointer from a reference node to a following node in the doubly-linked list involves:
proceeding from the reference node passing through, and optionally cleaning up, nodes that are marked as dead (deleted) until a live (undeleted) node is found;
if a live node is found, returning the live node; and
otherwise, if the end of the doubly-linked list is reached without finding a live node, returning NULL.

6. The method of claim 1, wherein following a backward pointer from a reference node to a preceding node in the doubly-linked list involves:
  proceeding backwards from the reference node passing through nodes that are marked as dead (deleted) until a live (undeleted) node is found;
  when a live node is found,
  comparing the forward pointer of the live node against the reference node,
  if the forward pointer of the live node points to the reference node, returning the live node, and
  otherwise, if the forward pointer of the live node does not point to the reference node, following forward pointers from the live node until a more-forward live node is found that points to the reference node, and if such a more-forward live node is found, returning the more-forward live node;
  wherein whenever the search follows a forward pointer from a live node to a more-forward live node, the backward pointer of the more-forward live node is updated, if necessary, to be consistent with the forward pointer from the live node;
  wherein a special value (possibly NULL) is returned if the reference node is deleted at any time during the search, and the NULL value is returned if the start of the doubly-linked list is encountered before finding a live node.

7. The method of claim 1, wherein marking the forward pointer to indicate that the target node is deleted involves atomically setting a deleted bit in the forward pointer.

8. The method of claim 1, wherein marking the forward pointer to indicate that the target node is deleted involves:
  creating a special node with a deleted type, which points to the immediately following node in the doubly-linked list; and
  atomically replacing the forward pointer with a pointer to special node.

9. A computer-readable storage device storing instructions that when executed by a computer cause the computer to perform a method for deleting a node from a doubly-linked list which is lock-free, wherein lock-free means that the doubly-linked list can be simultaneously accessed by multiple processes without requiring the processes to perform locking operations and furthermore that a finite number of steps taken by a process will guarantee progress by at least one process, the method comprising:
  receiving a reference to a target node to be deleted from the doubly-linked list;
    atomically marking a forward pointer in the target node to indicate that the target node is deleted by using a CAS (Compare And Swap) instruction with only one compare-and-swap per atomic operation to change the delete bit of the target node's forward pointer cell from live to dead, wherein the forward pointer contains the address of an immediately following node in the doubly-linked list, wherein the marking operation does not destroy the address of the immediately following node; and
    splicing the target node out of the doubly-linked list by,
      atomically modifying the forward pointer of an immediately preceding node in the doubly-linked list to point to the immediately following node in the doubly-linked list, instead of pointing to the target node, by using a CAS to change the forward pointer of the immediately preceding node from the target node to the address of the immediately following node, and
      modifying the backward pointer of an immediately following node in the doubly-linked list to point to the immediately preceding node in the doubly-linked list, instead of pointing to the target node.

10. The computer-readable storage device of claim 9, wherein the method further comprises inserting a new node into the doubly-linked list by:
  identifying a node immediately preceding desired location of the new node in the doubly-linked list;
  identifying a node immediately following the desired location of the new node in the doubly-linked list;
  creating the new node to which no other process has any reference and setting its value slots as desired; and
  splicing the new node into the doubly-linked list by,
    setting the forward pointer of the new node to point to the immediately following node,
    setting the backward pointer of the new node to point to the immediately preceding node,
    atomically updating the forward pointer of the immediately preceding node to point to the new node, and
    updating the backward pointer of the immediately following node to point to the new node.

11. The computer-readable storage device of claim 9, wherein the method further comprises performing an update to one or more fields in an existing node in the doubly-linked list by:
  obtaining a replacement node to replace the existing node, wherein other processes do not have references to the replacement node and therefore cannot initially access the replacement node;
  copying a snapshot of the existing node, including forward and backward pointers, to the replacement node;
  updating one or more fields in the replacement node which correspond to the one or more fields to be updated in the existing node;
  performing a single atomic operation that modifies a forward pointer of the existing node to point to the replacement node and also marks the forward pointer to indicate that the existing node is deleted, whereby the replacement node becomes part of the doubly-linked list and the existing node is deleted in a single atomic operation; and
  cleaning up the doubly-linked list structure by,
    atomically moving the forward pointer of the preceding node from existing node to the new node,
    updating the backward pointer of the immediately following node to point to the replacement node, and
    updating the backward pointer of the new node to point to the predecessor node of the existing node.

12. The computer-readable storage device of claim 11, wherein copying the snapshot of the existing node to the replacement node involves:
  copying all values from the existing node into the replacement node; and
  checking the forward pointer of the existing node to determine whether the existing node has been deleted;
  wherein if the existing node has node not been deleted, the snapshot is complete;
  wherein if the existing node has been deleted, the method further comprises following the forward pointer of the existing node to find an updated version of the existing node with which to reattempt the snapshot process.

13. The computer-readable storage device of claim 9, wherein following a forward pointer from a reference node to a following node in the doubly-linked list involves:
  proceeding from the reference node passing through, and optionally cleaning up, nodes that are marked as dead (deleted) until a live (undeleted) node is found;

when a live node is found, returning the live node; and
otherwise, if the end of the doubly-linked list is reached without finding a live node, returning NULL.

14. The computer-readable storage device of claim 9, wherein following a backward pointer from a reference node to a preceding node in the doubly-linked list involves:
proceeding backwards from the reference node passing through nodes that are marked as dead (deleted) until a live (undeleted) node is found;
when a live node is found,
comparing the forward pointer of the live node against the reference node,
if the forward pointer of the live node points to the reference node, returning the live node, and
otherwise, if the forward pointer of the live node does not point to the reference node, following forward pointers from the live node until a more-forward live node is found that points to the reference node, and if such a more-forward live node is found, returning the more-forward live node;
wherein whenever the search follows a forward pointer from a live node to a more-forward live node, the backward pointer of the more-forward live node is updated, if necessary, to be consistent with the forward pointer from the live node;
wherein a special value (such as NULL) is returned if the reference node is deleted at any time during the search, and NULL is returned if the start of the doubly-linked list is encountered before finding a live node.

15. The computer-readable storage device of claim 9, wherein marking the forward pointer to indicate that the target node is deleted involves atomically setting a deleted bit in the forward pointer.

16. The computer-readable storage device of claim 9, wherein marking the forward pointer to indicate that the target node is deleted involves:
creating a special node with a deleted type, which points to the immediately following node in the doubly-linked list; and
atomically replacing the forward pointer with a pointer to special node.

17. An apparatus for deleting a node from a doubly-linked list which is lock-free, wherein lock-free means that the doubly-linked list can be simultaneously accessed by multiple processes without requiring the processes to perform locking operations and furthermore that a finite number of steps taken by a process will guarantee progress by at least one process, the apparatus comprising:
a processor;
an execution mechanism on the processor, wherein the execution mechanism is configured to:
receive a reference to a target node to be deleted from the doubly-linked list;
atomically mark a forward pointer in the target node to indicate that the target node is deleted by using a CAS (Compare And Swap) instruction with only one compare-and-swap per atomic operation to change the delete bit of the target node's forward pointer cell from live to dead, wherein the forward pointer contains the address of an immediately following node in the doubly-linked list, wherein the marking operation does not destroy the address of the immediately following node; and
splice the target node out of the doubly-linked list by,
atomically modifying the forward pointer of an immediately preceding node in the doubly-linked list to point to the immediately following node in the doubly-linked list, instead of pointing to the target node, by using a CAS to change the forward pointer of the immediately preceding node from the target node to the address of the immediately following node, and
modifying the backward pointer of an immediately following node in the doubly-linked list to point to the immediately preceding node in the doubly-linked list, instead of pointing to the target node.

18. The apparatus of claim 17, wherein the execution mechanism is configured to insert a new node into the doubly-linked list by:
identifying a node immediately preceding desired location of the new node in the doubly-linked list;
identifying a node immediately following the desired location of the new node in the doubly-linked list;
creating the new node to which no other process has any reference and setting its value slots as desired; and to
splicing the new node into the doubly-linked list by,
setting the forward pointer of the new node to point to the immediately following node,
setting the backward pointer of the new node to point to the immediately preceding node,
atomically updating the forward pointer of the immediately preceding node to point to the new node, and
updating the backward pointer of the immediately following node to point to the new node.

19. The apparatus of claim 17, wherein the execution mechanism is configured to update one or more fields in an existing node in the doubly-linked list by:
obtaining a replacement node to replace the existing node, wherein other processes do not have references to the replacement node and therefore cannot initially access the replacement node;
copying a snapshot of the existing node, including forward and backward pointers, to the replacement node;
updating one or more fields in the replacement node which correspond to the one or more fields to be updated in the existing node;
performing a single atomic operation that modifies a forward pointer of the existing node to point to the replacement node and also marks the forward pointer to indicate that the existing node is deleted by using a CAS to change the delete bit of the target node's forward pointer cell from live to dead, whereby the replacement node becomes part of the doubly-linked list and the existing node is deleted in a single atomic operation; and
cleaning up the doubly-linked list structure by,
atomically moving the forward pointer of the preceding node from existing node to the new node,
updating the backward pointer of the immediately following node to point to the replacement node, and
updating the backward pointer of the new node to point to the predecessor node of the existing node.

20. The apparatus of claim 19, wherein while copying the snapshot of the existing node to the replacement node, the execution mechanism is configured to:
copy all values from the existing node into the replacement node; and to
check the forward pointer of the existing node to determine whether the existing node has been deleted;
wherein if the existing node has node not been deleted, the snapshot is complete;
wherein if the existing node has been deleted, the snapshot mechanism is configured to follow the forward pointer of the existing node to find an updated version of the existing node with which to reattempt the snapshot process.

21. The apparatus of claim 17, wherein while following a forward pointer from a reference node to a following node in the doubly-linked list, the execution mechanism is configured to:

proceed from the reference node passing through, and optionally cleaning up, nodes that are marked as dead (deleted) until a live (undeleted) node is found;

if a live node is found, to return the live node; and otherwise, if the end of the doubly-linked list is reached without finding a live node, to return NULL.

22. The apparatus of claim 17, wherein while following a backward pointer from a reference node to a preceding node in the doubly-linked list, the execution mechanism is configured to:

proceed backwards from the reference node passing through nodes that are marked as dead (deleted) until a live (undeleted) node is found;

when a live node is found, the execution mechanism is configured to compare the forward pointer of the live node against the reference node, if the forward pointer of the live node points to the reference node, to return the live node, and otherwise, if the forward pointer of the live node does not point to the reference node, to follow forward pointers from the live node until a more-forward live node is found that points to the reference node, and if such a more-forward live node is found, to return the more-forward live node;

wherein whenever the search follows a forward pointer from a live node to a more-forward live node, the backward pointer of the more-forward live node is updated, if necessary, to be consistent with the forward pointer from the live node;

wherein a special value (such as NULL) is returned if the reference node is deleted at any time during the search, and NULL is returned if the start of the doubly-linked list is encountered before finding a live node.

\* \* \* \* \*